INVENTOR
VINCENT C. DAVIS
BY
ATTORNEYS

INVENTOR
VINCENT C. DAVIS

BY
ATTORNEYS

United States Patent Office 3,486,363
Patented Dec. 30, 1969

3,486,363
AUTOMATIC FREEZING POINT INDICATOR
Vincent C. Davis, Richmond, Calif., assignor to Chevron Research Company, San Francisco, Calif., a corporation of Delaware
Continuation-in-part of application Ser. No. 417,414, Dec. 10, 1964. This application Feb. 13, 1967, Ser. No. 620,584
Int. Cl. G01n 25/02
U.S. Cl. 73—17
3 Claims

ABSTRACT OF THE DISCLOSURE

Automatic freezing point indicator and method in which the accuracy of measurement of the freezing point of a sample of a supercooled liquid by a technique using the liberated heat of fusion as a set-point condition in the measuring sequence, is improved by artificially initiating the crystallization of the sample by creating and passing a pressure wave through it at the occurrence of a preselected temperature—below true freezing point but above true supercooling point.

---

This application is a continuation-in-part of U.S. Ser. No. 417,414, filed Dec. 10, 1964.

BACKGROUND OF THE INVENTION

This invention relates to methods and apparatus for automatically determining and recording the freezing temperature of liquids. It relates particularly to the measurement and recording of the freezing point of liquids of refinery processes in which the freezing point is an index of product purity.

It is an object of the present invention to improve the accuracy of automatically measuring the freezing point of supercooled liquids in which the liberated heat of fusion is used as a set-point condition in the measuring sequence, by artificially initiating the crystallization of the sample at the occurrence of a preselected temperature within the sample below its true freezing point but above its true supercooling point. Inasmuch as the undercooling interval of the sample is always confined to a range compatible with the accuracy of the apparatus, the freezing point of the sample is accurately and automatically determined irrespective of the magnitude of its undercooling interval.

Heretofore engineers have determined the freezing point of liquids of refinery processes by methods and apparatus analogous to those described in ASTM-D 1015–55 (standard method of test for freezing points of high purity hydrocarbons). Although these methods have been automated and have provided satisfactory results, wide application and acceptance have been hindered by environmental limitations related to:

(1) Equalizing the temperature gradient across the tested liquid to avoid undercooling (necessitating the use of mechanical stirrers and scrapers to agitate the liquid), and (2) Initiating crystallization of the liquid after the freezing point has been reached (requiring special seeding procedures).

Recently attempts have been made to simplify on-stream measurement of the freezing point of liquids. One example of such efforts is described in Patent No. 3,060,318, "Method and Apparatus for the Testing of Fluids," P. Ouvrard, issued Oct. 23, 1962, in which a cooling gas is automatically introduced into a liquid sample. The gas cools and agitates the sample, and initiates its crystallization. The gas must be removed before the freezing point of the sample is measured. Introducing a foreign cooling gas into the sample, however, may in some cases lead to interactions incompatible with accurate detection of freezing points so that suitable applications for the method may be correspondingly limited. Another example is described in the parent application assigned to the assignee of the present application ("Automatic Freezing Point Indicator and Method," Ser. No. 417,414, filed Dec. 10, 1964). In the above application, I suggest that supercooled liquids liberate sufficient latent heat of fusion upon crystallization to allow a portion of a sample of these liquids adjacent to a temperature detector to return to its true freezing point irrespective of the condition of other portions of the sample remote from the measured portion. (The term "supercooled liquid" means a liquid which remains in true liquid state although cooled below its true freezing point.) This discovery is utilized to provide a novel procedure and apparatus that dispenses with mechanical stirrers, scrapers, or seeding procedures, yet provides accurate and automatic measurement of the freezing point of process liquid through the use of a programmed sequence of measuring steps based, in part, upon the liberated heat of fusion of the sample.

The apparatus and method described in my previous application is useful in the manufacture of many of today's fusible substances in which the freezing point of the substance is a measure of its purity. In these processes, the freezing point can be automatically measured by cooling a sample of the substance so that its temperature decreases with time through an undercooling interval below its true freezing point. At its supercooling point, crystallization occurs. As the heat of fusion is liberated, automatic equipment becomes operative to record the true freezing point. The recorded result must be, of course, a true representation of the true freezing point of the substance, say, to a tolerance of +.01° C., since it often determines whether or not the finished product will be accepted or rejected.

The recorded freezing point has been found to accurately correlate with true freezing point when the undercooling interval of the sample is relatively small. But, as the undercooling interval increases there is often substantial deviation. Accordingly, it would be desirable to measure the freezing point of any fusible substance irrespective of its undercooling interval to the same accuracy now obtained for samples having rather small undercooling intervals.

SUMMARY OF THE INVENTION

Briefly, my apparatus includes a sample vessel for supporting a molten sample of a fusible substance, means for cooling the sample so that its temperature decreases with time, a temperature detector immersed in the sample and means responsive to said temperature detector adapted to initiate its crystallization and to record its true freezing point. The responsive means preferably includes recording means for recording the freezing point of the sample and control means adapted to be selectively responsive to sample temperature within said undercooling interval to initiate crystallization of the sample by creating and passing a pressure wave through the sample vessel and, thereafter, to initiate operation of the recording means at the occurrence of an increase in the sample temperature so as to cause permanent recordation of the freezing point. The increase in temperature is caused by the liberation of latent heat within the sample and occurs after crystallization has been initiated by the pressure wave.

In accordance with another aspect of the invention, the freezing point of a sample of a liquid having an undercooling characteristic supported within a sample vessel can be determined by:

(a) Cooling the sample over a temperature interval including temperatures below the freezing point of said liquid whereby said sample is undercooled with respect to its true freezing point, (b) Monitoring the temperature of said sample, (c) Producing a pressure wave within said sample at the occurrence of a preselected temperature within said sample so as to cause said sample to crystallize, the preselected temperature being within the undercooling interval of said sample below its true freezing point but above its true supercooling point, (d) Actuating recording means as the monitored temperature of said sample first rises due to liberation of latent heat within said sample to permanently record the temperature-time variations of the sample, and (e) Terminating the recording of the temperature of said sample after a predetermined time interval.

DESCRIPTION OF THE DRAWINGS

Other features of the invention will become more apparent to those more skilled in the art from the following description of a preferred embodiment of the invention in which.

DESCRIPTION OF PREFERRED EMBODIMENTS

Figure 1:
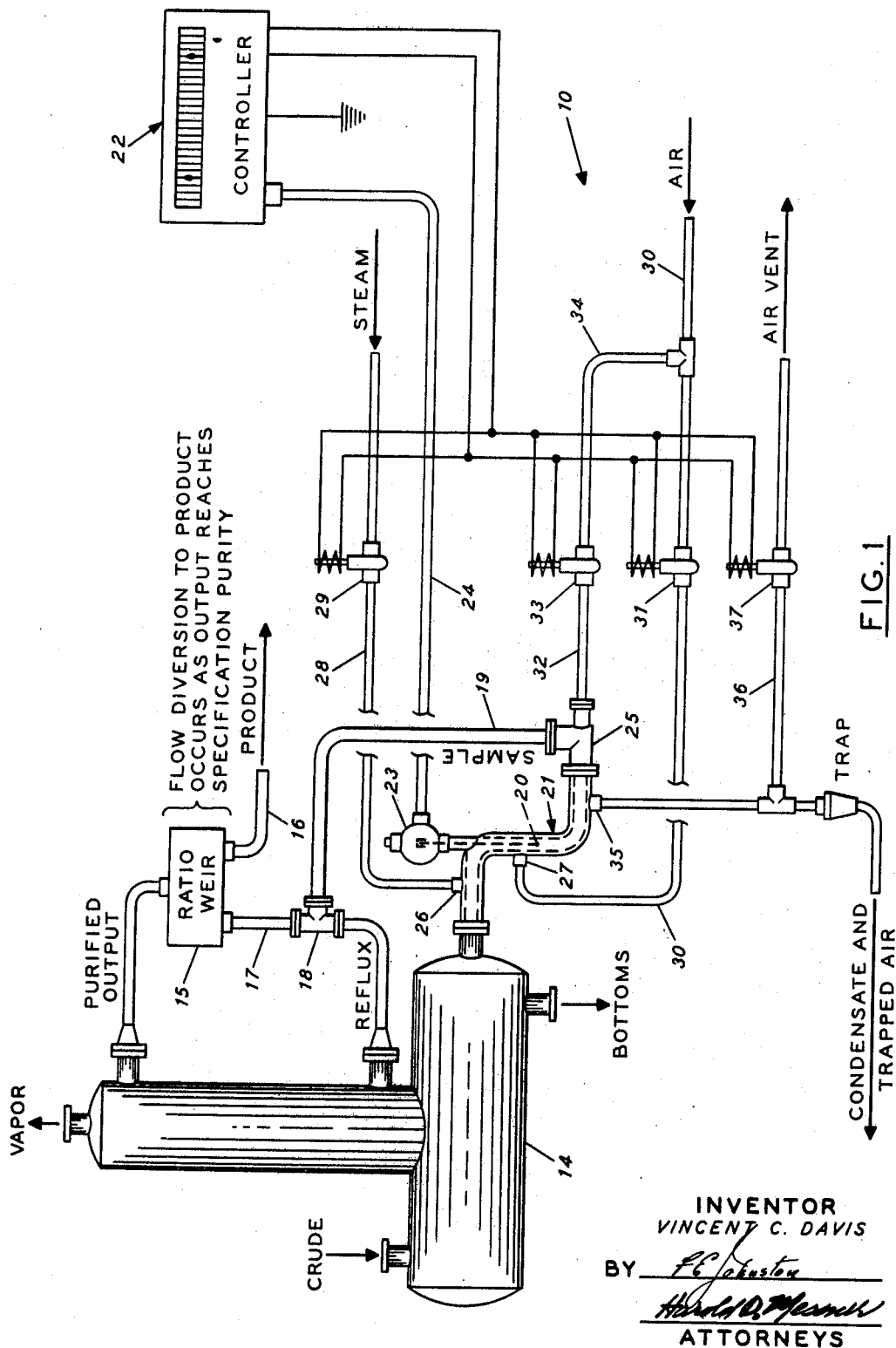
FIGURE 1 is a flow diagram, partially schematic of a process for purifying liquids in which a portion of recycled output from a distillation vessel is sampled by the freezing indicator in accordance with the invention.

Reference should now be made to the embodiment of FIGURE 1 where the operation of the freezing point indicator 10 is illustrated with reference to a purification process in the manufacture of phthalic anhydride. Purification processes are well understood in the art and are known to include the use of batch distillation unit 14 through which the processed material, such as the crude phthalic anhydride, is processed. A ratio weir 15 connected at the outlet of unit 14 recycles the distilled phthalic anhydride until specification purity is reached at which time the weir 15 is adjusted to increase flow in product conduit 16 and decrease the flow in reflux conduit 17.

The freezing point indicator 10 of the present invention is positioned between the outlet of ratio weir 15 and the recycle inlet of unit 14, and basically comprises a low heat capacity thermister 20, an insulated sample cell 21 and a controller 22. The thermister 20 is supported mechanically within the cell 21 and is electrically connected to controller 22 by suitable leads passing through support housing 23 and conduit 24. The sample cell 21 mechanically connects to conduit 17 through three-way valve 18, conduit 19 and two-way valve 25. It also includes coupling ports 26 and 27 to sequentially admit: (1) steam via conduit 28 and valve 29, and (2) cooling air via conduit 30 and valve 31.

The sample enters the cell through valve 25 having a gate stem 32 operatively connected by fluid pressure to control valve 33 of conduit 34. The cooling air exits from the cell by way of coupling vent 35 and conduit 36 controlled by valve 37. The controller 22 provides program timing signals to sequentially operate the valves 29, 31, 33 and 37. The timing signals provide automatic control of the flow and the temperature of the sample and in addition provide for the permanent recordation of the measurements of the freezing point of the sample.

Having briefly described an application of the invention, the freezing point indicator 10 will now be described in detail.

Figure 2:
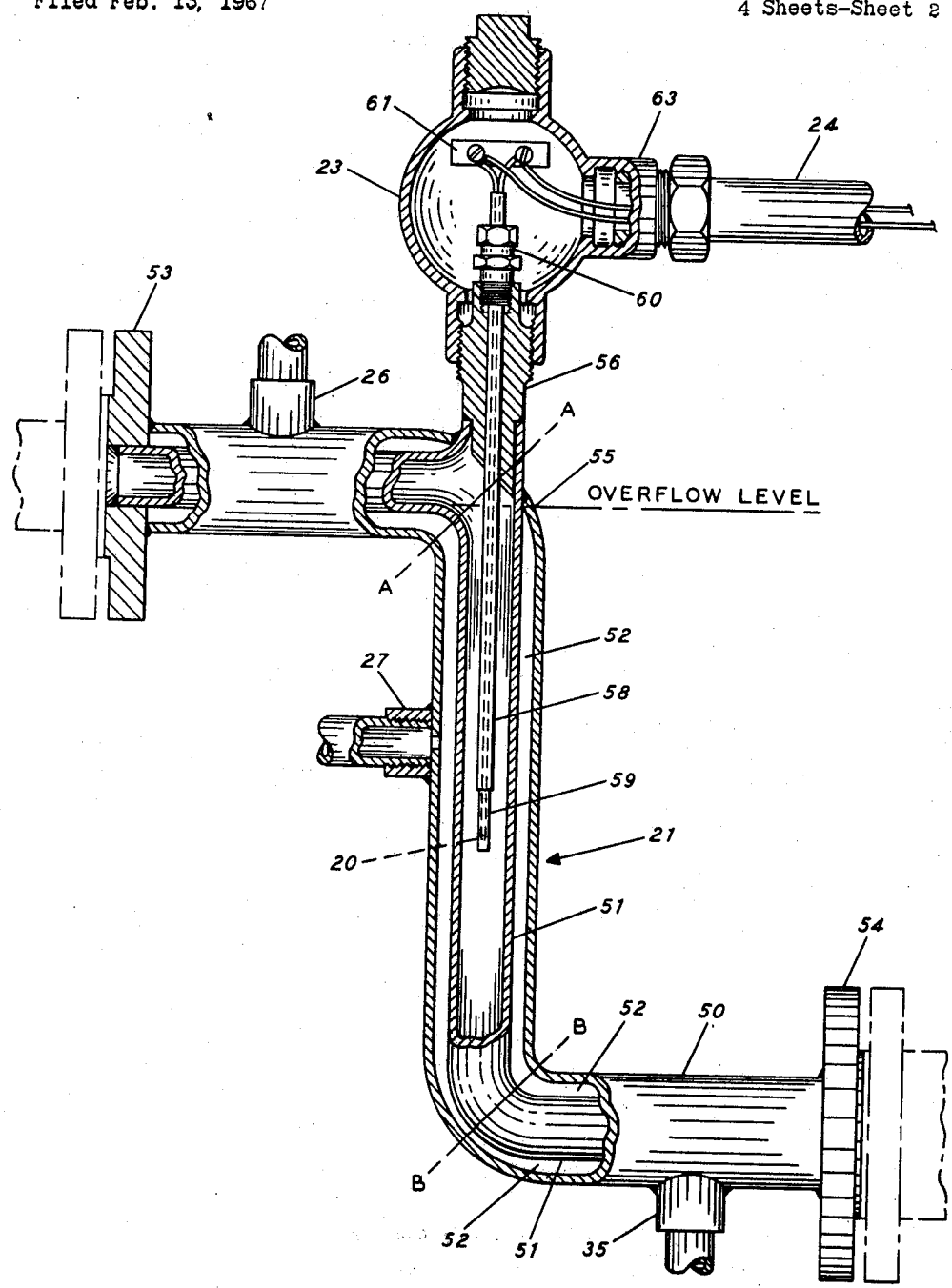
FIGURE 2 is an elevational view, partially cut away, of the sample cell and thermister of the freezing point indicator of FIGURE 1.

Referring now to FIGURE 2, sample cell 21 is constructed of double-walled pipe sections 50 and 51. They are concentrically formed about one another but are spaced apart over the center portion to form an annular space 52. The sample is entrained within pipe section 51 concentric of thermister 20 and is of greatest importance over the interval of pipe defined by lines A—A and B—B. Steam or cooling air circulates in the annular space 52 to regulate the temperature of the sample. As indicated, pipe sections 50 and 51 are joined at their ends by blind flanges 53 and 54. Intermediate these flanges, the sections are unsupported except at elbow 55 where the pipe section 51 extends through pipe section 50 and connects to the hub of support member 56. The coupling port 27 is located approximately at the mid-point of the longitudinal section of the cell adjacent to the thermister 20. Inasmuch as the transverse dimensions of the sample are much smaller than the length dimensions between lines A—A and B—B, cold air entering through port 27 cools the center section of the sample at a higher rate than the sample sections above and below the entry port. Thus a heat reservoir is conveniently provided above and below the center section of the sample adjacent to thermister 20. As undercooling occurs, the reservoir aids in the recovery of the sample to its true freezing point by minimizing the heat loss of the central section. The sample can thus be kept at a freezing point for several minutes after undercooling occurs, aiding accurate recordation of the freezing point of the sample.

The temperature of the sample is determined by the thermister 20 supported in the center portion of the cell. The thermister comprises a temperature sensitive resistor supported within aluminum tube 59. The aluminum tube 59 attaches to support member 56 through tubular member 58. The tube 59 averages the temperature variations occurring over the sample. This prevents rapid fluctuations of the measuring controller due to convection currents as the sample is cooled. In this embodiment, male connector 60 secures the stainless steel tubular member 58 to support member 56. The leads of the thermister pass through both members 56 and 58 to attach to terminal board 61. The terminal board is insulated from the atmosphere by the housing 23. The wires pass from the housing through outlet 63 and conduit 24 to the controller 22.

Figure 4:
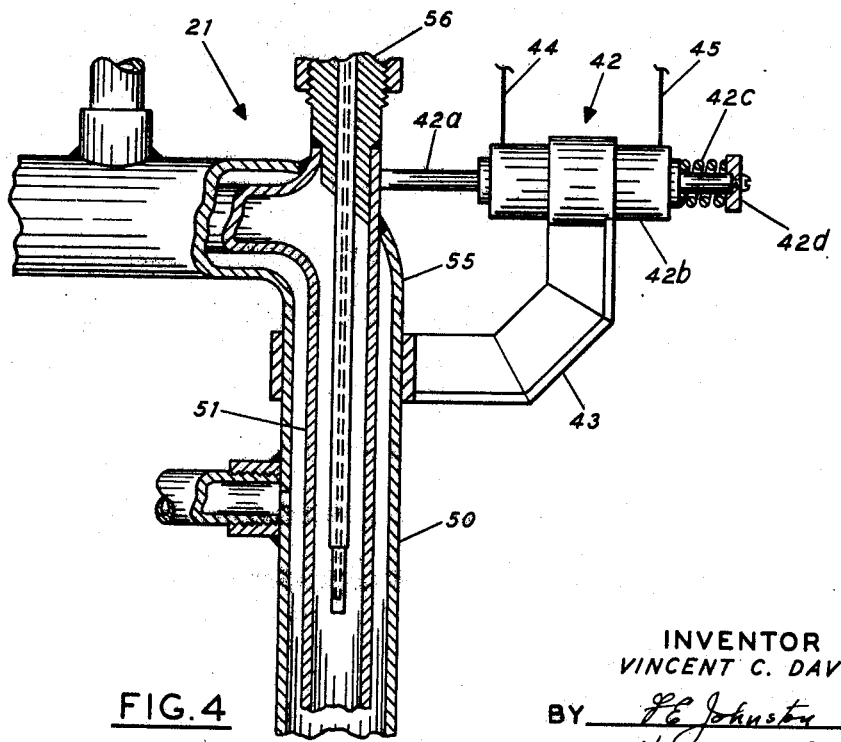
FIGURE 4 is a partially schematic elevational view of the sample cell and thermister of FIGURE 2 with the addition of a solenoid for sequentially contacting the sample cell to create a pressure wave to cause the sample therein to crystallize.

FIGURE 4 illustrates sample cell 21 modified to allow the generation of a pressure wave within inner pipe section 51 at the occurrence of a predetermined set-point temperature within the sample. To selectively generate the pressure wave, the cell 21 is provided with a solenoid 42 positioned adjacent to elbow 55 where the inner pipe section 51 extends through the outer pipe section 50 and connects to the hub of support member 56. Preferably, solenoid 42 is of conventional design and includes a plunger 42a slidably positioned within solenoid housing 42b. Housing 42b is attached to the cell 21 by L-shaped connector 43. When the predetermined set-point temperature within the sample is reached, the solenoid 42 is energized by passing current to the solenoid causing plunger 42a to move into contact with the cell 21. The abrupt termination of the movement of the plunger 42a as it contacts the cell creates a pressure wave within the sample supported within the inner pipe section 51. As the pressure wave propagates through the sample, the sample is caused to crystallize and liberate sufficient heat of fusion to allow its temperature to increase until its true freezing point is reached. A spring return 42c is positioned at the end of plunger 42a between its hub 42d and solenoid housing 42b so as to allow the plunger to return to its original position, after the solenoid is deactivated. Leads 44 and 45 pass from the solenoid housing, as shown, for connection to controller 22.

Figure 3:
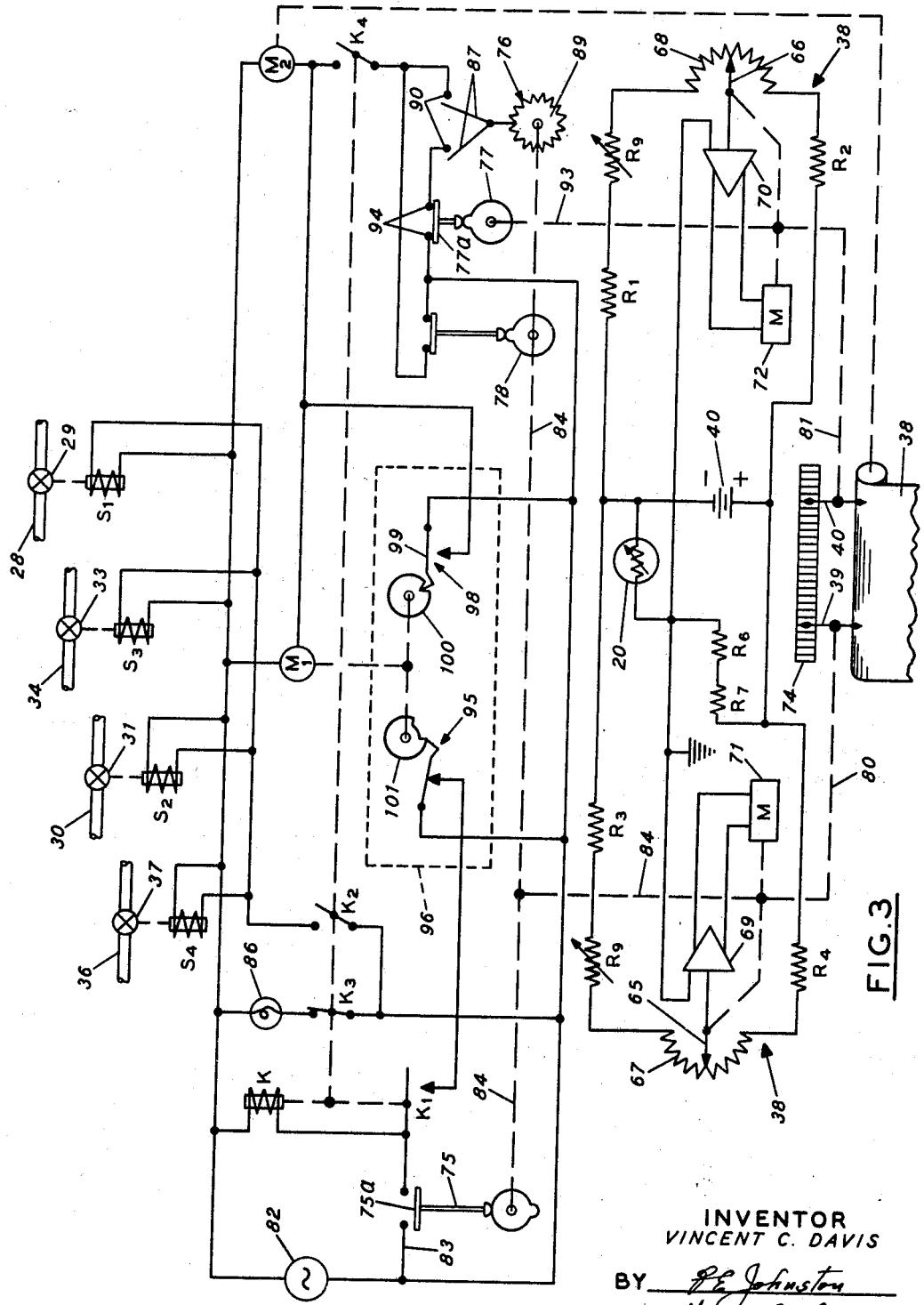
FIGURE 3 is a circuit diagram of the control circuitry of the freezing point indicator.

Referring to FIGURE 3, the controller 22 includes a recorder generally indicated at 38 modified to provide timing signals to operate the valves 29, 31, 33 and 37 as well as to operate chart motor $M_2$. The recorder 38 is a standard two-pen strip chart recorder in which the normal measuring circuits have been replaced by a double-bridge circuit. The thermister 20 forms one arm of the circuit common to both bridges. The operation of the double-bridge circuit is well known in the art, and basically involves the production of unbalanced conditions in one arm of the circuit followed by restoration of a balanced condition of the circuit by changes in the resistivity of other branches of the bridge circuit. In the embodiment of FIGURE 3 the change in the value of thermister 20 is balanced by the adjustment of contacts 65 and 66 relative to slidewires 67 and 68 respectively. To provide the adjustment, the recorder includes a circuit-adjusting means such as phase-sensitive amplifiers 69 and 70 and motors 71 and 72. The motors 71 and 72 have windings that may be selectively operated by the amplifiers to drive the contacts relative to the slidewires to produce zero potential across the amplifiers. These motors, however, are operative only within the temperature sensitivity of the bridge circuit based on the signal response applied to the amplifiers. In the usual case, temperature range is controlled by the selection of the resistors $R_1$, $R_2$, $R_3$, $R_4$, $R_6$ and thermister 20 forming the double-bridge circuit. For the embodiment of FIGURE 3, the resistors $R_1$ and $R_2$ and slidewire 68 are selected so that slide contact 66 responds only to a temperature range of 1°; the resistors $R_3$ and $R_4$ and slidewire 67 are selected so that slide contact 65 responds only to a temperature range of 30°. To provide the above ranges, the following values of $R_1$, $R_2$, $R_3$, $R_4$, $R_6$, slidewires 67 and 68 and thermister 20 are preferred for a temperature centering about 130° C:

| | Value (ohms) |
|---|---|
| $R_1$ | 1,000 |
| $R_2$ | 1,000 |
| $R_3$ | 250 |
| $R_4$ | 250 |
| Thermister | [1] 15,000 |
| $R_6$ | 15,000 |
| Slidewire 68 | 16 |
| Slidewire 67 | 200 |

[1] At center temperature.

In the above preferred embodiment, bridge supply 41 operates at 1.68 volts, which is kept low to prevent self heating of the thermister; resistors $R_9$ are rated at 100 ohms and are used to center the temperature intervals. These temperature intervals are usually centered at the expected freezing point of the sample, although in slidewire 67, the center temperature may vary therefrom as long as the freezing point of the sample is within the end points of the selected range.

The motors 71 and 72 are not only mechanically connected to the contacts 65 and 66 but also connect to recorder pens 39 and 40 and to recorder switches 75, 76, 77 and 78. As indicated, as the contacts 65 and 66 are moved relative to the slidewires 67 and 68, pens 39 and 40 are adjusted relative to scale 74 and chart 38 through the mechanical linkages designated 80 and 81. Limit switches 75, 77 and 78 and ratchet switch 76 also mechanically connect to the motors. They provide programmed timing signals for operation of solenoids $S_1$, $S_2$, $S_3$ and $S_4$ and chart motor $M_2$.

Figure 5:
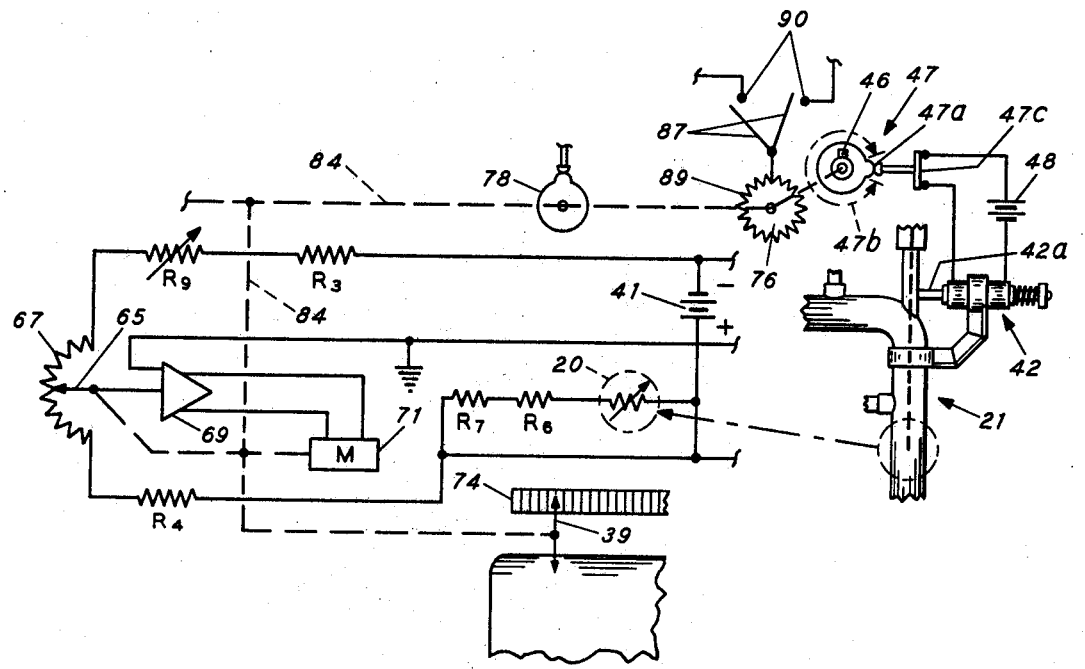
FIGURE 5 is a partial schematic diagram of one circuit arm of the control of the freezing point indicator of FIGURE 3 for actuating the solenoid of FIGURE 4 at the occurrence of a preset sample temperature.

FIGURE 5 illustrates a portion of the double-bridge section of controller 22 modified to selectively energize wave-producing solenoid 42 of the sample cell of FIGURE 4. In the modification, motor 71 is not only mechanically linked to contact 65, pen 39 and recorder switches 76 and 78, as previously described, but is also now mechanically linked to cam switch 47. This is accomplished, by way of example, by extending linkage 84 to cam switch 47 through ratchet switch 76. As indicated, cam switch 47 includes an outer surface fitted with a cam lift 47a and a cam dwell section 47b and has a central bore appropriately journalled to the extension of mechanical linkage 84 as by an adjustable connector 46. By relating the angular position of cam lift 47a with the liner registry of pen 39 relative to its scale 74, cam follower 47c is caused to contact cam lift 47a at the occurrence of a set-point temperature within the sample as measured by thermister 20. Closing of the cam switch 47 places solenoid 42 in series with a source of current 48 allowing current to flow through the windings of the solenoid. As the plunger 42a (responding to the magnetic field created by the current flow) contacts the cell 21, the pressure wave is generated and travels through the sample initiating its crystallization.

Set-point temperautre for actauting solenoid 42 can be adjusted by relocating the angular position of the cam left 47a relative to mechanical linkage 84. Preferably, the set-point temperature is slightly below the true freezing point of the sample, say, in the range of ½ to 7° C., but can be as much as 15° C. therebelow so as to allow crystallization of the sample to occur above its true supercooling point.

In the embodiment in accordance with FIGURES 3 and 5 the temperature response of the contact 65 and pen 39 are normalized for operation between 110° and 140° C. Likewise the contact 66 and pen 40 are normalized for operation between 130.2° C. and 131.2° C. (the expected freezing point range of the sample) and cam switch 47 is normalized to close at a temperature below the response level of contact 66 and pen 40 but within the response level of contact 65 and pen 39, say, 127° C.

Assume the process for purification of crude phthalic anhydride has just begun. A batch charge enters distillation unit 14 and ratio weir 15 at the distilled side is set to reflux all of the charge. As the distilled stream emerges from the weir, a portion is sampled at the valve 18 and passes into the sample cell.

Prior to the entry of the sample, the temperature measured by the thermister in the cell is below the operating threshold of the controller. With the controller in a quiescent state, switch 75 is open with respect to conductor 83, and the circuit that includes relay K and power source 82 is inoperative. Swith 75 is a standard limit switch having a cam and cam follower. The follower is mechanically linked to motor 71 through linkage 84. Solenoids $S_1$, $S_2$, $S_3$ and $S_4$ connect to the power source 82 through relay contact $K_2$. But inasmuch as contact $K_2$ is open in the quiescent stage of the controller, they are also in the deenergized state. With the solenoids deenergized, the valves controlled by the solenoids are placed in the following operative states:

(1) Valve 29 is opened with respect to the steam source to circulate steam through the cell to assure that the sample is flowable within the cell, (2) Flow valve 33 is opened with respect to conduit 34 to allow passage of the sample into the cell through valve 25, (3) Cooling air valve 31 is closed with respect to air conduit 30 to prevent premature cooling of the sample, and (4) Vent valve 37 is closed to prevent exiting of the steam from the sample cell as by way of conduit 36.

Relay contact $K_3$ is closed with respect to the power source, allowing panel light 86 to be energized to show that the cell is being heated.

Assume the temperature of the sample is above 140° C., the upper limit of the controller. As the sample flows into the cell, temperature measured by the thermister begins to immediately increase and, at the threshold temperature of the controller initiates operation of the controller. In the initial stage of operations, the operative bridge circuit includes amplifier 69, contact 65, slidewire 67 and pen 39. Adjustments of contact 65 relative to slidewire 67 and pen 39 relative to scale 74 register the initial temperature changes in the cell. As the pen 39 moves upscale relative to indicator 74, its initial movement closes switch 76 in the circuit that includes power source 82, contact $K_4$, chart motor $M_2$ and switch 77a. As indicated, the switch 76 provides contacts 87 pivoted by pinion 89 to close contact points 90. However, after the switch 76 closes, a circuit that includes the chart motor $M_2$ and the power source 82 remains disconnected inasmuch as relay contact $K_4$ between the motor and the switch 76, remains open.

When threshold temperature of the second stage of the controller is reached, the pen 40 is actuated by the movement of contact 66 relative to slidewire 68. Adjustment of the contact is by motor 72 mechanically connected to the pen 40 by the linkage 81. Due to the limit range of the second stage, i.e., of 1° total range, the pen 40 quickly goes full scale relative to the scale 74. Full scale movement actuates switch 77 through linkage 93. Contact 77a disconnects pen 39 from contact points 94. Thereafter pen 39 also reaches upper scale and actuates the switch 75 through linkage 84 closing the relay K with respect to the power source 82.

With the relay energized, the conditions of the relay contacts reverse, as follows:

(1) Relay contact $K_1$ is closed thereby electrically connecting the relay K to the power source 82 irrespective of the condition of switch 75;

(2) Relay contact $K_2$ is also closed thereby placing solenoids $S_1$–$S_4$ in electrical contact with the power source 82;

(3) Relay contact $K_3$ is open, denergizing the lamp 86; and (4) Relay contact $K_4$ is closed, but chart motor $M_2$ is not electrically connected to the power source inasmuch as the switch 77 is open with respect to the contact points 94.

As the relay is energized, the operating conditions of the valves controlled by the solenoids $S_1$–$S_4$ also reverse. Both the steam valve 29 and valve 33 controlling the flow of the sample into the cell, close; the cooling air and air vent valves 31 and 37, respectively, are open.

As the cooling air circulates through the cell, the sample begins to cool. Inasmuch as the temperature of the sample is above the upper range of the bridge circuit that includes amplifier 69, motor 71, and pen 39, the controller is in a quiescent state. As the sample cools below the upper range, however, the temperatures of the sample are registered through the adjustment of contact 65 relative to the slidewire 67. As the pen 39 moves downscale relative to indicator 74, the switch 76 is opened by the rotational movement of pinion 89 pivoting contacts 87 away from contact points 90. The switch 75 also opens but the relay K remains energized as current now passes through the relay by way of switch 95 of conventional timer 96. As the sample cools within the upper range of the bridge circuit including amplifier 70, motor 72 and pen 40, pen 40 starts downscale relative to the indicator thereby closing switch 77. As the contacts of switch 77 close it should be observed that no current flows through timing motor $M_1$ inasmuch as switch 76 is now open.

The sample continues to cool. The pen 39 continues to register the sample temperature relative to scale 74 as adjustments are made between contact 65 and slidewire 67 by motor 71. At the present set-point temperature of the sample, the cam switch 47 (FIGURE 5) is closed in the circuit that includes solenoid 42 and current source 48. Plunger 42a strikes sample cell 21 creating a pressure wave within the sample which initiates crystallization. As crystallization occurs, latent heat in the sample is liberated. That portion of the sample adjacent to the detector 20 is warmed. The decrease of the temperature of the sample ceases and thereafter increases with time. The cam switch 47 quickly opens deactivating solenoid 42. Referring to FIGURE 3, when the temperature of the sample first increases, pen 39 reverses direction. Through mechanical linkage, the reversal of the direction of the sample temperature causes counterrotation of pinion 89 and the closing of contact points 90. Current now flows to timing motor $M_1$ by the closing of contact points 90 as well as flows to chart motor $M_2$ to initiate recording of the temperature of the sample. As the timing motor starts, the switch 98 will close, as lever arm 99 is driven from the notch of cam 100, connecting the power source directly to the chart drive motor $M_2$. After the temperature of the sample has increased to its true freezing point it remains there until the sample is frozen and then decreases with time. As the temperature of the frozen sample first decreases with time, switch 76 opens with respect to the contact points 90, but the timing motor will continue to run for one revolution of the cam 100 irrespective of the condition of switch 76 inasmuch as the timing motor is directly coupled to the power source 82 through the switch 98 of the timer. The speed of the timing motor $M_1$ is selected to drive the chart motor $M_2$ for a time period sufficient to record peaks of the temperature after the sample has crystallized irrespective of sample size. As the timing motor turns, the switch 95 remains closed until its contact finger drops into a notch of cam 101 thereby terminating current flow to the relay K. As the switch 95 opens and the relay is deenergized, the relay contacts $K_1$, $K_2$ and $K_4$ are opened and relay contact $K_3$ closes thereby initiating a new cycle. Thereafter the switch 98 also opens as the lever arm 99 returns to the notch of cam 100, thereby disconnecting the power source 82 from the timing and chart motors. As the new cycle is initiated it should be observed that steam is admitted to the cell and the frozen sample is heated to a liquid state thereby facilitating its removal from the cell as a fresh sample enters.

If the sample fails to undercool or if the purity of the sample is below the range of the recorder, switch 78 will close when pen 39 reaches its low limit. This will cause the timing and chart motors to run their cycles and initiate a new cycle.

Table I summarizes the operation of the controller during a measuring cycle.

While certain preferred embodiments of the invention have been specifically disclosed, it should be understood that the invention is not limited thereto as many variations will be readily apparent to those skilled in the art and the invention is to be given its broadest possible interpretation within the terms of the claims to follow.

TABLE I.—CONTROLLER CIRCUIT

| Condition | Valve | | | | Relay K | Switch | | | | |
|---|---|---|---|---|---|---|---|---|---|---|
| | 25 | 29 | 31 | 37 | | 47 | 75 | 76 | 77 | 78 |
| (1) Empty cell | Open | Open | Closed | Closed | Inactive | Open | Open | Open | Closed | Closed. |
| (2) Sample temp. w/in sensitivity range of Pen 39 as sample is heated. | do | do | do | do | do | do | do | Closed | do | Open. |
| (3) Sample temp. w/in sensitivity of Pen 40. | do | do | do | do | do | do | do | do | do | Do. |
| (4) Sample temp. above sensitivity of Pens 39 and 40. | Closed | Closed | Open | Open | Active | do | Closed | do | Open | Do. |
| (5) Sample temp. w/in sensitivity range of Pens 39 & 40 as sample cools. | do | do | do | do | do | do | Open | Open | Closed | Do. |
| (6) Sample temp. coincides with set-point temperature for actuation of Solenoid 42. | do | do | do | do | do | Closed | do | do | do | Do. |
| (7) Sample temp. in supercooling range and heat of crystal. is liberated. | do | do | do | do | do | Open | do | Closed | do | Do. |
| (8) Timer 96 in Opn. and sample continues to cool. | do | do | do | do | do | do | do | do | do | Do. |
| (9) After Timer 96 disconnected. | Open | Open | Closed | Closed | Inactive | do | do | do | do | Do. |

| Condition | Contact | | | | Chart motor $M_2$ | Timing motor $M_1$ | Switch | | Pen | |
|---|---|---|---|---|---|---|---|---|---|---|
| | $K_1$ | $K_2$ | $K_3$ | $K_4$ | | | 95 | 98 | 39 | 40 |
| (1) Empty cell | Open | Open | Closed | Open | Inoper | Inoper | Closed | Open | Inoper | Inoper. |
| (2) Sample temp. w/in sensitivity range of Pen 39 as sample is heated. | do | do | do | do | Inoper | Inoper | do | do | Oper | Inoper. |
| (3) Sample temp. w/in sensitivity of Pen 40. | do | do | do | do | Inoper | Inoper | do | do | Oper | Oper. |
| (4) Sample temp. above sensitivity of Pens 39 and 40. | Closed | Closed | Open | Closed | Inoper | Inoper | do | do | Inoper | Inoper. |
| (5) Sample temp. w/in sensitivity range of Pens 39 & 40 as sample cools. | do | do | do | do | Inoper | Inoper | do | do | Oper | Oper. |
| (6) Sample temp. coincides with set-point temperature for actuation of Solenoid 42. | do | do | do | do | Inoper | Inoper | do | do | Oper | Oper. |
| (7) Sample temp. in supercooling range and heat of crystal. is liberated | do | do | do | do | Oper | Oper | do | do | Oper | Oper. |
| (8) Timer 96 in Opn. and sample continues to cool. | do | do | do | do | Oper | Oper | Open | do | Oper | Oper. |
| (9) After Timer 96 disconnected. | Open | Open | Closed | Open | Inoper | Inoper | Closed | Open | Oper | Inoper. |

I claim:

1. An apparatus for automatically determining and recording the freezing point of a fusible substance which has a supercooling characteristic, comprising a sample vessel for supporting a molten sample of said substance, means for cooling said sample so that its temperature dicreases with time, a temperature detector immersed in said sample, and means responsive to said temperature detector adapted to initiate crystallization of said sample and to record its true freezing point, said responsive means including control means adapted to be selectively responsive to sample temperature within said supercooling interval of said sample, recording means responsive to said control means for recording said freezing point of said sample, at the occurrence of an increase in the temperature of said sample and wave-producing means responsive to said control means to cause a pressure wave within said sample for initiating crystallization thereof at the occurrence of a preset temperature within said sample, said increase in temperature to cause recordation of said freezing point of said sample being caused by the liberation of latent heat within said sample occurring after crystallization of said sample has been initiated by said pressure wave, said control means includes condition means having discrete operating states adapted to cause energization of said wave-producing means so as to initiate crystallization of said sample in response to a change in operating state of said condition means, said condition means including a series of switches, at least one of which being adapted to change operating state at the occurrence of said preselected sample temperature so as to actuate said pressure wave-producing means, said pressure wave-producing means including plunger means adapted to be positioned adjacent to said sample chamber and electrical drive means operatively connected to said plunger means adapted to respond to said change of said operating state of said one switch so as to move said plunger means into contact with said sample vessel to cause said pressure wave in said sample.

2. Apparatus in accordance with claim 1 in which said drive means includes return means adapted to return said plunger means to its original location after contacting said vessel.

3. Apparatus in accordance with claim 1 in which said recording means includes first and second scribe means operatively controlled by said temperature detector, chart means in operative contact with said scribe means, and chart drive means selectively and operatively contacting said chart means through said condition means so as to cause movement thereof in response to a change in operating state of said condition means as said sample temperature increases with time due to the liberation of latent heat within said sample, said condition means including a series of switches mechanically linked to said scribe means of said recording means adapted to be, at least, scale responsive to a preset sample temperature within said supercooling interval so as to activate said pressure wave-producing means and direction responsive to increases in temperature of said sample within said supercooling level so as to cause actuation of said chart means by said drive means as said sample crystallizes to record the freezing point of said sample.

References Cited

UNITED STATES PATENTS 2,635,456  4/1953  Barstow _____ 73—17
2,885,885  5/1959  Lupfer et al. _____ 73—17

OTHER REFERENCES

Abele, J. E.: The Physical Background to Freezing Point Osmometry and Its Medical-Biological Applications, from The American Journal of Medical Electronics, January 1963, pp. 35–37.

JERRY W. MYRACLE, Primary Examiner